United States Patent
Lin et al.

(10) Patent No.: US 10,174,977 B2
(45) Date of Patent: Jan. 8, 2019

(54) APPARATUS AND METHOD FOR SUBCOOLING CONTROL BASED ON SUPERHEAT SETPOINT CONTROL

(71) Applicant: Liebert Corporation, Columbus, OH (US)

(72) Inventors: Zhiyong Lin, Dublin, OH (US); Benedict J. Dolcich, Westerville, OH (US); John F. Judge, Galena, OH (US)

(73) Assignee: Vertiv Corporation, Columbus, OH (US)

( * ) Notice: Subject to any disclaimer, the term of this patent is extended or adjusted under 35 U.S.C. 154(b) by 866 days.

(21) Appl. No.: 14/514,466

(22) Filed: Oct. 15, 2014

(65) Prior Publication Data

US 2015/0027139 A1    Jan. 29, 2015

Related U.S. Application Data

(63) Continuation-in-part of application No. 14/078,734, filed on Nov. 13, 2013.

(60) Provisional application No. 61/729,037, filed on Nov. 21, 2012.

(51) Int. Cl.
*F25B 49/00* (2006.01)
*F25B 49/02* (2006.01)

(52) U.S. Cl.
CPC ........ *F25B 49/02* (2013.01); *F25B 2341/065* (2013.01); *F25B 2400/06* (2013.01); *F25B 2400/075* (2013.01); *F25B 2600/2513* (2013.01); *F25B 2700/1931* (2013.01); *F25B 2700/1933* (2013.01);
(Continued)

(58) Field of Classification Search
CPC ...... F25B 49/02; F25B 2500/19; G05D 23/19
See application file for complete search history.

(56) References Cited

U.S. PATENT DOCUMENTS 5,440,891 A * 8/1995 Hindmon, Jr. ........ F25B 49/022
236/78 D
5,651,263 A    7/1997 Nonaka et al.
(Continued)

FOREIGN PATENT DOCUMENTS

CN    1093792 A    10/1994
CN    1321867 A    11/2001
(Continued)

OTHER PUBLICATIONS

First Office Action for Chinese Application No. 201310587153.6 dated Oct. 24, 2016 with English translation; 19 pages.

*Primary Examiner* — Ljiljana V. Ciric
*Assistant Examiner* — Alexis K Cox

(57) ABSTRACT

A system including a setpoint module, a summer, a control module, and an expansion valve module. The setpoint module is configured to indirectly control sub-cooling of a condenser by adjusting a superheat setpoint based on (i) a return air temperature setpoint or a supply air temperature setpoint, and (ii) an outdoor ambient temperature. The summer is configured to determine an error between the superheat setpoint and a superheat level of a compressor. The control module is configured to generate a control signal based on the error. The expansion valve module is configured to electronically control a state of an expansion valve based on the control signal.

19 Claims, 7 Drawing Sheets

(52) U.S. Cl.
CPC .............. *F25B 2700/2106* (2013.01); *F25B 2700/21151* (2013.01); *Y02B 30/72* (2013.01)

(56) References Cited

U.S. PATENT DOCUMENTS

| | | | |
|---|---|---|---|
| 5,712,467 A * | 1/1998 | Straka | D01J 13/005 |
| | | | 219/481 |
| 5,735,134 A | 4/1998 | Liu et al. | |
| 5,809,794 A | 9/1998 | Sibik et al. | |
| 6,318,100 B1 | 11/2001 | Brendel et al. | |
| 6,318,101 B1 | 11/2001 | Pham et al. | |
| 6,711,911 B1 | 3/2004 | Grabon et al. | |
| 8,539,785 B2 | 9/2013 | Jiang et al. | |
| 8,578,724 B2 | 11/2013 | Turner et al. | |
| 9,873,307 B2 * | 1/2018 | Suzuki | B60H 1/00921 |
| 2003/0192329 A1 * | 10/2003 | Sarkisian | F25B 15/04 |
| | | | 62/148 |
| 2003/0192330 A1 * | 10/2003 | Sarkisian | F25B 15/04 |
| | | | 62/149 |
| 2005/0198981 A1 | 9/2005 | Arno | |
| 2005/0235660 A1 | 10/2005 | Pham | |
| 2005/0284153 A1 | 12/2005 | Hwang et al. | |
| 2006/0042282 A1 | 3/2006 | Ludwig et al. | |
| 2008/0196425 A1 * | 8/2008 | Temple | F25B 49/00 |
| | | | 62/172 |
| 2008/0302117 A1 * | 12/2008 | Alston | F25B 39/02 |
| | | | 62/230 |
| 2009/0031740 A1 | 2/2009 | Douglas | |
| 2009/0228153 A1 | 9/2009 | Ogawa | |
| 2009/0259362 A1 * | 10/2009 | Veittinger | G01D 3/022 |
| | | | 701/33.4 |
| 2010/0005819 A1 | 1/2010 | Kawakatsu et al. | |
| 2010/0024455 A1 | 2/2010 | Butorac et al. | |
| 2010/0180630 A1 * | 7/2010 | Ogawa | F25B 41/04 |
| | | | 62/498 |
| 2010/0204840 A1 * | 8/2010 | Sun | F25B 49/02 |
| | | | 700/282 |
| 2011/0011125 A1 * | 1/2011 | Kasahara | F25B 13/00 |
| | | | 62/498 |
| 2011/0022346 A1 * | 1/2011 | Rossi | H04L 12/2825 |
| | | | 702/130 |
| 2011/0082651 A1 * | 4/2011 | Mowris | F24F 11/30 |
| | | | 702/45 |
| 2012/0117995 A1 * | 5/2012 | Moore | F25B 49/022 |
| | | | 62/157 |
| 2012/0221150 A1 * | 8/2012 | Arensmeier | G05B 23/0224 |
| | | | 700/276 |
| 2012/0247138 A1 * | 10/2012 | Senf, Jr. | F25B 49/02 |
| | | | 62/191 |
| 2012/0260678 A1 | 10/2012 | Yoshida | |
| 2012/0266623 A1 | 10/2012 | Patel et al. | |
| 2013/0098088 A1 | 4/2013 | Lin et al. | |
| 2013/0160474 A1 | 6/2013 | Qu et al. | |
| 2013/0174591 A1 | 7/2013 | Das et al. | |
| 2014/0137573 A1 | 5/2014 | Lin et al. | |
| 2014/0206102 A1 | 7/2014 | Petrucelli et al. | |
| 2015/0153086 A1 * | 6/2015 | Takayama | F25B 5/04 |
| | | | 62/228.3 |
| 2016/0084539 A1 * | 3/2016 | Schutte | F25B 13/00 |
| | | | 62/498 |

FOREIGN PATENT DOCUMENTS

| | | |
|---|---|---|
| CN | 1683848 A | 10/2005 |
| CN | 1705852 A | 12/2005 |
| CN | 1959305 A | 5/2007 |
| CN | 101240962 A | 8/2008 |
| CN | 101578490 A | 11/2009 |
| CN | 102102897 A | 6/2011 |
| CN | 102374714 A | 3/2012 |
| CN | 102652245 A | 8/2012 |
| CN | 103216981 A | 7/2013 |
| CN | 103363745 A | 10/2013 |
| JP | 2001147052 A | 5/2001 |
| WO | WO-2013119489 A2 | 8/2013 |

* cited by examiner

APPARATUS AND METHOD FOR SUBCOOLING CONTROL BASED ON SUPERHEAT SETPOINT CONTROL

CROSS-REFERENCE TO RELATED APPLICATIONS

The present disclosure is a Continuation-in-part application of U.S. patent application Ser. No. 14/078,734 filed on Nov. 13, 2013. This application claims the benefit of U.S. Provisional Application No. 61/729,037, filed on Nov. 21, 2012. The entire disclosures of the above applications are incorporated herein by reference.

FIELD

The present disclosure relates to cooling systems, and more particularly, expansion valve control systems.

BACKGROUND

This section provides background information related to the present disclosure which is not necessarily prior art.

Cooling systems have applicability in a number of different applications where a fluid is to be cooled. The fluid may be a gas, such as air, or a liquid, such as water. Example applications are heating, ventilation, air conditioning (HVAC) systems that are used for cooling spaces where people are present such as in offices and data centers. A data center may refer to a room having a collection of electronic devices, such as computer servers.

In FIG. 1, an air conditioner 50 that may be used in, for example, a computer room is shown. The air conditioner 50 includes a cooling circuit 51 and a cabinet 52. The cooling circuit 51 is disposed in the cabinet 52 and includes an evaporator 54, an air moving device 56, a compressor 58, a condenser 60, and an expansion valve 62. The evaporator 54, compressor 58, condenser 60 and expansion valve 62 are connected in a closed loop in which a cooling fluid (e.g., phase change refrigerant) circulates. The evaporator 54 may include a V-coil assembly with multiple cooling slabs to provide increased cooling capacity. The evaporator 54 receives the cooling fluid and cools air passing through openings in evaporator 54. The air moving device 56 (e.g., a fan or squirrel cage blower) draws the air from an inlet (not shown) in the cabinet 52 and through the evaporator 54. The cooled air is directed from the evaporator 54 and out of a plenum 64 in the cabinet 52.

The compressor 58 circulates the cooling fluid through the condenser 60, the expansion valve 62, the evaporator 54 and back to the compressor 58. The compressor 58 may be, for example, a scroll compressor. A scroll compressor may be a fixed speed, digital, or variable speed compressor. A scroll compressor typically includes two offset spiral disks. The first spiral disk is a stationary disk or scroll. The second spiral disk is an orbiting scroll. The cooling fluid is received at an inlet of the scroll compressor, trapped between the offset spiral disks, compressed, and discharged at a center (or outlet) towards the condenser 60. The condenser 60 may be a micro-channel condenser that cools the cooling fluid received from the compressor 58. The expansion valve 62 may be an electronic expansion valve and may expand the cooling fluid out of the condenser 60 from, for example, a liquid to a vapor.

A position of the expansion valve 62 (or opening percentage of the expansion valve) may be adjusted to control a suction superheat value of the compressor 58. The suction superheat value of the compressor is equal to a compressor suction temperature minus a compressor saturated suction temperature. A compressor suction pressure may be used to determine the compressor saturated suction temperature. The compressor suction temperature and the compressor suction pressure may be determined based on signals from corresponding sensors connected between the evaporator 54 and the compressor 58. The superheat value refers to an amount that a temperature of a cooling fluid, in a gas state, is heated above the compressor saturated suction temperature.

The superheat value can be used to modulate (or adjust) position of the expansion valve 62. Position (or opening percentage) control of the expansion valve 62 may be performed by a proportional, integral, derivative (PID) control module. The PID control module controls the superheat value to match a constant predetermined superheat setpoint. This ensures compressor reliability and improves compressor efficiency.

SUMMARY

This section provides a general summary of the disclosure, and is not a comprehensive disclosure of its full scope or all of its features.

A system is provided that includes a setpoint module, a summer, a control module, and an expansion valve module. The setpoint module is configured to indirectly control sub-cooling of a condenser by adjusting a superheat setpoint based on (i) a return air temperature setpoint or a supply air temperature setpoint, and (ii) an outdoor ambient temperature. The summer is configured to determine an error between the superheat setpoint and a superheat level of a compressor. The control module is configured to generate a control signal based on the error. The expansion valve module is configured to electronically control a state of an expansion valve based on the control signal.

In another aspect, a method is provided that includes: indirectly controlling sub-cooling of a condenser by adjusting a superheat setpoint based on (i) a return air temperature setpoint or a supply air temperature setpoint, and (ii) an outdoor ambient temperature; determining an error between the superheat setpoint and a superheat level of a compressor; generating a control signal based on the error; and electronically controlling a state of an expansion valve based on the control signal.

In another aspect, a system is provided and includes an error module configured to integrate a difference between a superheat signal and a superheat setpoint to generate an error signal, wherein the superheat signal indicates suction superheat values of a compressor. A comparison module is configured to compare the error signal to a first predetermined threshold to generate a first comparison signal based on the comparison. A zero-crossing module is configured to compare a first count value to a second predetermined threshold to generate a second comparison signal. The first count value is generated based on at least one comparison between the superheat signal and the superheat setpoint. A setpoint module is configured to adjust the superheat setpoint based on the first comparison signal and the second comparison signal.

In another aspect, a system is provided and includes a boundary counter, a boundary module, a setpoint module, and a control module. The boundary counter is configured to increment a first count value when a superheat signal of a compressor exceeds a predetermined limit. The boundary module is configured to compare the first count value to a first predetermined threshold to generate a first comparison signal. The setpoint module is configured to adjust a superheat setpoint based on the first comparison signal. The control module is configured to adjust a position of an expansion valve based on the superheat setpoint.

In another aspect, a system is provided and includes an instability module, a discharge module, and a setpoint module. The instability module is configured to determine whether an unstable suction superheat condition of a compressor exists and generate an instability signal. The discharge module is configured to compare a discharge pressure of the compressor to a predetermined pressure to generate a first comparison signal. The setpoint module is configured to adjust a superheat setpoint based on the instability signal and the first comparison signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected implementations and not all possible implementations, and are not intended to limit the scope of the present disclosure.

Corresponding reference numerals indicate corresponding parts throughout the several views of the drawings.

DETAILED DESCRIPTION

Figure 1:
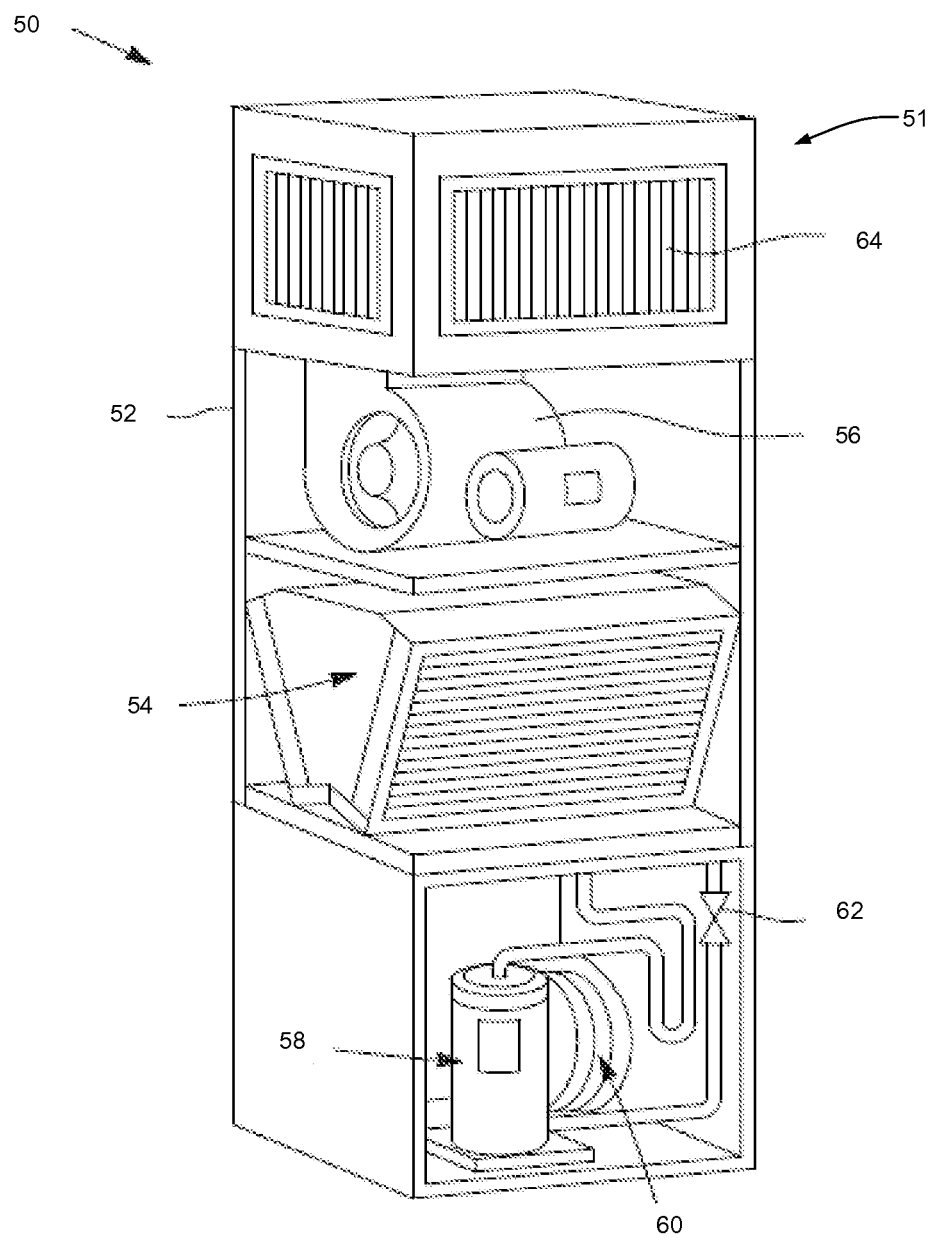
FIG. 1, is a perspective view of a prior art air conditioner.

Example implementations will now be described more fully with reference to the accompanying drawings.

An air conditioning system may include a condenser (or outdoor coil), an expansion valve, an evaporator (or indoor coil), and a compressor. A position (or opening percentage) of the expansion valve may be adjusted to maintain a superheat value of the compressor at a predetermined (or adjusted) superheat setpoint. Due to changes in indoor operating conditions of the air condition system, unstable operation of the air condition system can result. The examples disclosed herein prevent unstable conditions from occurring and if an unstable condition arises, the examples stabilize the air condition system. This instability prevention and stabilization is provided through regulation and/or adjustment of the superheat setpoint.

Indoor operating conditions of the air conditioning system can vary, for example, due to changes in requested temperature and/or dehumidification settings. The operating condition changes, relative sizes of condenser and evaporator volumes, and either too low a charge (less than a first predetermined charge) or too high a charge (greater than a second predetermined charge) of cooling fluid in the evaporator can lead to an unstable operation. A charge of cooling fluid may refer to an amount or a mass of cooling fluid. The superheat value may be maintained in the presence of, for example, a low-charge of cooling fluid in the evaporator to avoid a high-discharge (output) pressure of the compressor. The compressor may cutout when discharge pressure of the compressor is greater than a predetermined pressure. Maintenance of the superheat value in the presence of a high-charge of cooling fluid in the evaporator can lead to a loss of sub-cooling out of the condenser. The loss of sub-cooling can result in unstable compressor operation. Unstable compressor operation can result in unstable air condition system operation.

The implementations disclosed below include stabilizing a superheat value of a compressor in various operating conditions. The implementations include managing a cooling fluid charge between an evaporator and a condenser to obtain stable operation. This includes adjusting a superheat setpoint based on certain parameters (e.g., compressor suction pressure, compressor inlet temperature, and compressor discharge pressure). The parameters are dependent on the operating conditions. As a result, the implementations provide dynamic regulation of a superheat setpoint for expansion valve position control. The implementations allow a superheat value of a compressor to be stabilized to an appropriate setpoint, which may be determined in real-time (or during operation of the associated air conditioning system). If an unstable superheat condition is detected, superheat setpoint regulation is performed to reset the superheat setpoint from a current setting to rebalance the charge between the evaporator and the condenser, which stabilizes the superheat value and system operation.

Figure 2:
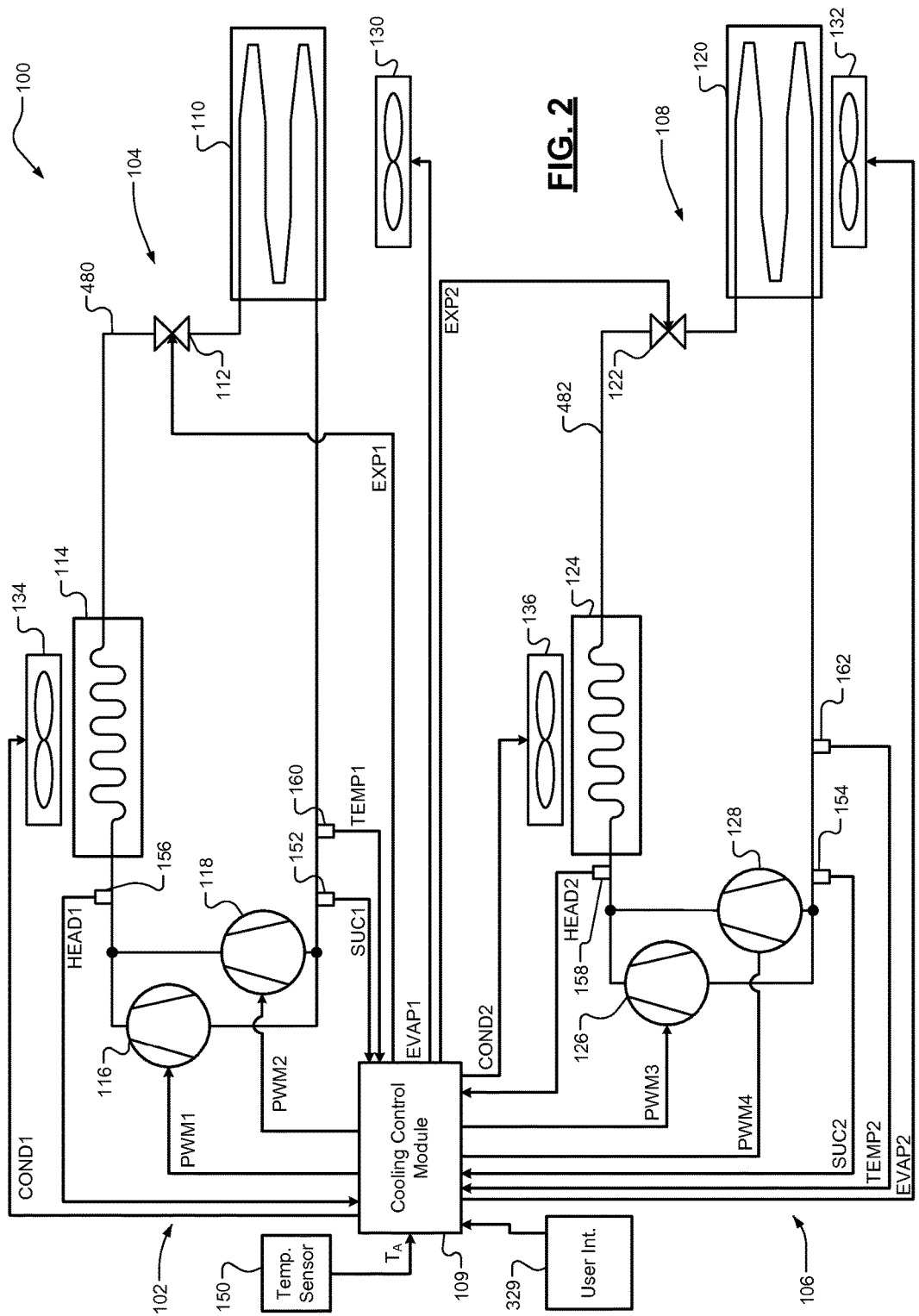
FIG. 2, is a schematic view of a multi-stage cooling system incorporating a cooling control module in accordance with an aspect of the present disclosure.

FIG. 2 shows a schematic of a cooling system 100. The cooling system 100 may be an inverter air-conditioning system and includes an upstream cooling stage 102 with an upstream (or first) cooling circuit 104 and a downstream (or second) cooling stage 106 with a downstream cooling circuit 108. The cooling circuits 104, 108 are controlled via a cooling control module 109. Although two cooling circuits are shown, a different number of cooling circuits may be included. The upstream cooling circuit 104 includes a first evaporator 110, a first expansion valve 112, a first condenser 114, a first compressor 116, and a second compressor 118. The downstream cooling circuit 108 includes a second evaporator 120, a second expansion valve 122, a second condenser 124, a third compressor 126, and a fourth compressor 128. The evaporators 110, 120 have respective evaporator fans 130, 132. The condensers 114, 124 have respective condenser fans 134, 136.

The cooling control module 109 may generate condenser fan signals COND1. COND2, evaporator fan signals EVAP1, EVAP2, expansion valve signals EXP1, EXP2, and compressor signals PWM1, PWM2, PUMP3, PUMP4 to control the fans 130, 132, 134, 136, expansion valves 112, 122, and the compressors 116, 118, 126, 128.

The cooling control module 109 may control the fans 130, 132, 134, 136, the expansion valves 112, 122, and/or the compressors 116, 118, 126, 128 based on signals from various sensors. The sensors may include, for example, an ambient temperature sensor 150, suction pressure sensors 152, 154, head pressure sensors 156, 158 and/or compressor inlet (or evaporator outlet) temperature sensors 160, 162. The ambient temperature sensor 150 may be an outdoor ambient temperature sensor and generate an ambient temperature signal $T_A$. The suction pressure sensors 152, 154 generate suction pressure signals SUC1, SUC2 and detect pressures of fluid received by the compressors 116, 118, 126, 128. The head pressure sensors 156, 158 generate head pressure (or discharge pressure) signals HEAD1, HEAD2 and detect pressures of fluid out of the compressors 116, 118, 126, 128. The temperature sensors 160, 162 detect temperatures of fluids (i) downstream from the evaporators 110, 120, and (ii) between the evaporators 110, 120 and the compressors 116, 118, 126, 128. Although not shown, pressure sensors and/or temperature sensors may also be included to detect pressures and/or temperatures of fluids (i) between the condensers 114, 124 and the expansion valves 112, 122, and/or between the expansion valves 112, 122 and the evaporators 110, 120.

The evaporators 110, 120 may be micro-channel (MC) cooling coil assemblies and/or includes a MC heat exchanger and/or may be fin-and-tube cooling coil assemblies. The expansion valves 112, 122 may be electronic based expansion valves (e.g., EEVs). The EEVs 112, 122 may be used to adjust flow of refrigerant to the evaporators 110, 120. This allows the cooling system 100 to be maintained at proper working conditions for precise temperature control and to provide quick cooling and minimize energy consumption. The proper working conditions may include, for example, maintaining a subcooling temperature of the cooling system 100 (or out of the condensers 114, 124) at a predetermined subcooling temperature (e.g., 5° F.) and/or within a predetermined subcooling temperature range of the predetermined subcooling temperature. The term "subcooling" as used herein may refer to a fluid existing at a temperature below a normal saturation temperature of the fluid.

Each of the condensers 114, 124 may be of a variety of types, such as an air-cooled condenser, a water-cooled condenser, or glycol cooled condenser. The condensers 114, 124 may include heat rejection devices that transfer heat from return fluids to a cooler medium, such as outside air. The heat rejection devices may include air or liquid cooled heat exchangers.

In each of the circuits 104, 108, a cooling fluid (or refrigerant) is circulated by a respective pair of the compressors 116, 118, 126, 128. The fluids flow from the compressors 116, 118, 126, 128, through the condensers 114, 124, expansion valves 112, 122, and evaporators 110, 120 and back to the compressors 116, 118, 126, 128. The evaporators 110, 120 may be arranged in stages such that air flows in a serial fashion first through the upstream evaporator 110 and then through the downstream evaporator 120. By having multiple cooling stages arranged for serial air flow, a temperature differential across the evaporators 110, 120 is reduced. This in turn allows the evaporators 110, 120 to operate at different pressure levels and allows the pressure differences between the respective evaporators 110, 120 and condensers 114, 124 to be reduced.

Since compressor power is a function of a pressure difference between an evaporator and a condenser, a lower pressure difference is more energy efficient. Each of the cooling circuits 104, 108 may include a pair of tandem compressors (e.g., compressors 116, 118 or compressors 126, 128). Each of the tandem compressors may be a fixed capacity scroll compressor (e.g., compressors 116, 126) or a variable capacity scroll compressor (e.g., compressors 118, 128). The fixed capacity scroll compressors may be activated (powered ON) and deactivated (powered OFF) based on control signals generated by the cooling control module 109. The variable capacity scroll compressors may be controlled via a respective digital signal received from the cooling control module 109.

Each of the cooling circuits 104, 108 may include a tandem set of compressors. Each of the tandem sets may include two compressors of equal volumetric displacement. The first compressor may be a digital pulse width modulation (PWM) scroll compressor that receives a PWM percentage signal to control speed and capacity of the first compressor. The second compressor may be a fixed speed scroll compressor with simply ON/OFF capacity control. Suction and discharge lines of these two compressors may be piped in parallel to form the tandem set. As an example, compressors 116, 126 may be PWM scroll compressors and compressors 118, 128 may be fixed speed scroll compressors. The fixed speed scroll compressors may receive ON/OFF control signals rather than PWM signals from the cooling control module 109.

The tandem set compressor configuration allows for energy efficient temperature control by providing a wide range of capacity modulation for a cooling circuit of an air conditioning system. The tandem sets offer an energy efficient configuration at compressor startup by allowing the digital PWM scroll compressors to be activated prior to the fixed speed scroll compressors. This effectively allows the tandem sets to provide partial-displacement operation with a reduced volumetric displacement/capacity until additional capacity is needed from the fixed scroll compressors.

Figure 3:
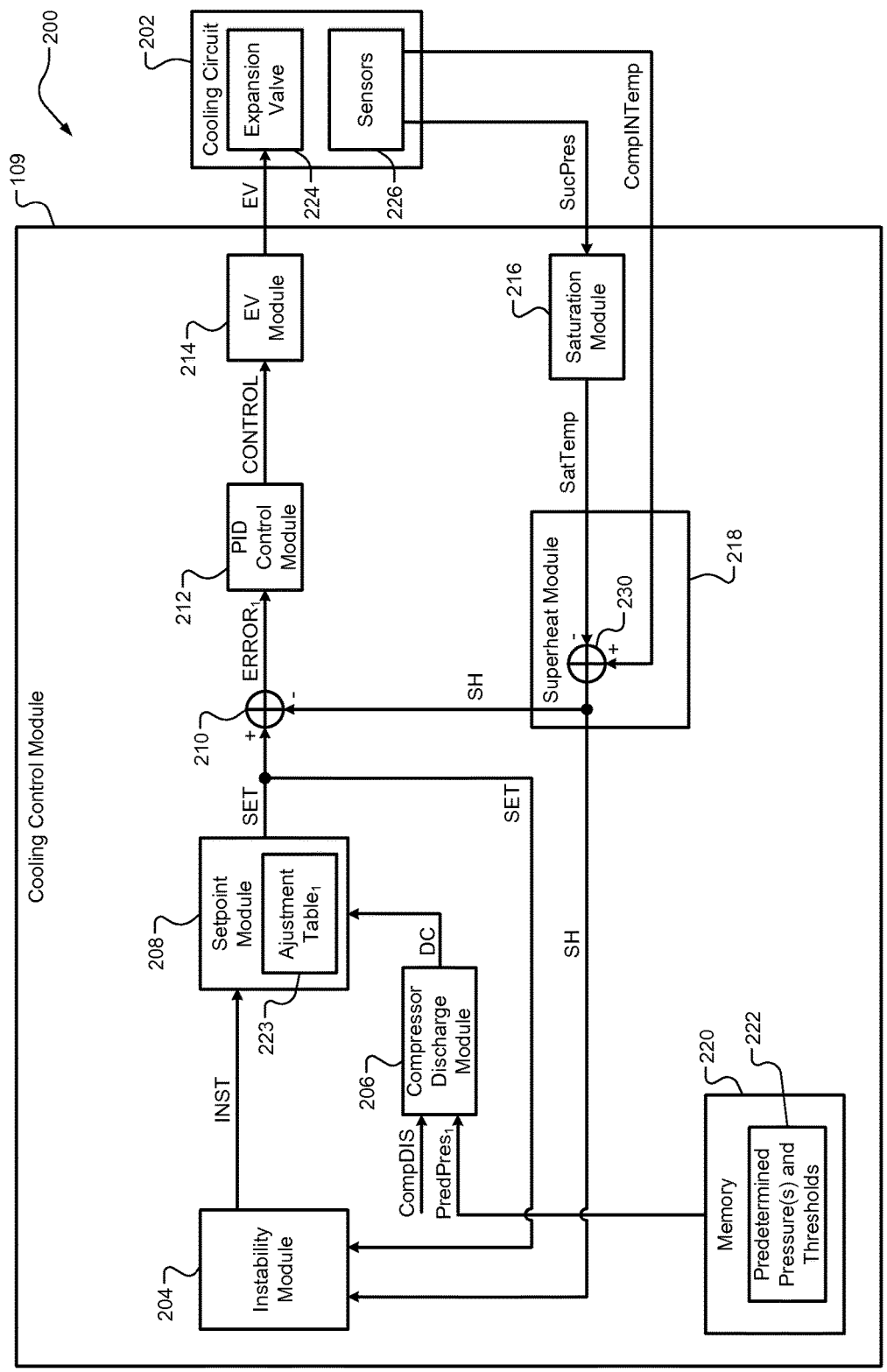
FIG. 3, is a functional block diagram of a superheat setpoint regulation system in accordance with an aspect of the present disclosure.

Referring also to FIG. 3, a superheat setpoint regulation system 200 is shown. The superheat setpoint regulation system 200 includes the cooling control module 109 and a cooling circuit 202 (e.g., one of the cooling circuits 104, 108 of FIG. 2). The cooling control module 109 includes an instability module 204, a compressor discharge module 206, a setpoint module 208, a summer 210, a PID control module 212, an expansion valve (EV) module 214, a saturation module 216 and a superheat module 218. The instability module 204 determines whether an unstable superheat condition exists based on a superheat setpoint SET and a superheat signal SH, which includes a superheat value. The superheat setpoint SET is a target superheat value. The super heat value SH indicates a superheat level of a compressor (e.g., one of the compressors 116, 118, 126, 128) of the cooling circuit 202. The instability module 204 generates an instability signal INST indicating whether an unstable condition exists. The instability signal may be a digital signal. Determination of an unstable superheat condition is further described below with respect to FIGS. 4 and 5.

The compressor discharge module 206 determines whether a discharge pressure of the compressor has exceeded a first predetermined pressure $PredPres_1$. The compressor discharge module 206 may compare a discharge signal CompDIS received from a discharge sensor (e.g., one of the sensors 152, 158) and generate a discharge comparison signal DC. The predetermined pressure $PredPres_1$ may be accessed from a memory 220, which stores predetermined pressure(s) and thresholds 222.

The setpoint module 208 generates the superheat setpoint signal SET based on the instability signal INST and the discharge signal DC. The setpoint module 208 may generate the superheat setpoint signal SET based on, for example, a first adjustment table 223. An example of an adjustment table is provided as Table 1.

TABLE 1

Adjustment Table

| Unstable Condition Detected | High Discharge Pressure (CompDIS > PredPres) | Superheat Setpoint Change |
|---|---|---|
| 1 (TRUE) | 0 (FALSE) | 1 (Increase Setpoint) |
| 0 (FALSE) | 0 (FALSE) | 0 (No Change) |
| 0 (FALSE) | 1 (TRUE) | −1 (Decrease Setpoint) |
| 1 (TRUE) | 1 (TRUE) | −1 (Decrease Setpoint) |

The summer 210 subtracts the superheat signal SH from the superheat setpoint SET to generate an error signal $ERROR_1$. The PID control module 212 provides PID control of a position of an EV 224 (e.g., one of the EVs 112, 122) of the cooling circuit 202. The PID control module 212 generates a control signal CONTROL to control the position of the EV 224 based on the error signal $ERROR_1$. The PID control module 212 may have tuning parameters such as PID gains, which may be used to determine PID values for EV control. The EV module 214 generates an EV signal to adjust the position of the EV 224 based on the control signal CONTROL. The EV 224 is an electronically controlled expansion valve.

The superheat module 218 receives sensor signals from sensors 226 (e.g., sensors 154, 156, 160, 162) of the cooling circuit 202 and/or a saturation temperature SatTemp from the saturation module 216. The sensor signals may include a suction pressure signal SucPres and compressor inlet temperature signal CompINTemp. The saturation module 216 determines the saturation temperature SatTemp of the compressor based on the suction pressure signal SucPres. The superheat module 218 may include a second summer 230, which may subtract the saturation temperature SatTemp from the compressor inlet temperature CompINTemp to generate the superheat signal SH.

Figure 4:
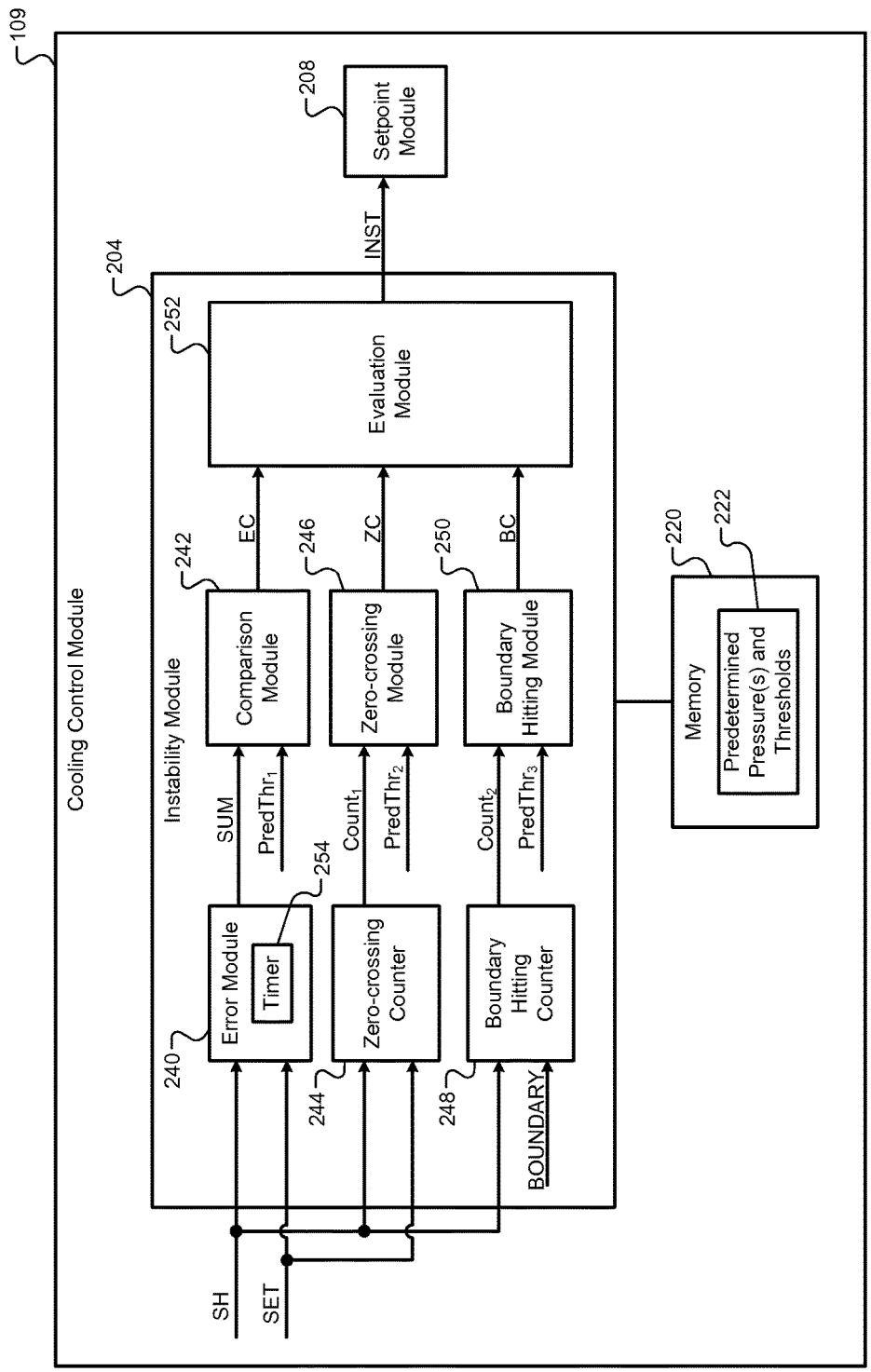
FIG. 4, is a functional block diagram of a portion of the cooling control module of FIG. 2 incorporating an instability module in accordance with an aspect of the present disclosure.

Referring also to FIG. 4, a portion of the cooling control module 109 is shown. The cooling control module 109 includes the instability module 204, the setpoint module 208 and the memory 220. The instability module 204 distinguishes unstable behaviors from stable behaviors. Unstable signals can present periodic oscillations with amplitudes greater than predetermined thresholds and/or setpoints. The instability module 204 includes an error module 240, a comparison module 242, a zero-crossing counter 244, a zero-crossing module 246, a boundary hitting counter 248, a boundary hitting module 250, and an evaluation module 252.

The error module 240 receives the superheat signal SH and the superheat setpoint signal SET and may generate a second error signal $ERROR_2$. The second error signal $ERROR_2$ is generated based on a difference between the superheat signal SH and the setpoint signal SET. The error signal may be, for example, a sinusoidal signal. The difference between the superheat signal SH and the setpoint signal SET (or the first error signal $ERROR_1$) may be integrated over time and normalized based on a moving window, as further described below.

To detect an unstable superheat condition, the error module 240 may integrate an absolute value of the first error signal $ERROR_1$ over time based on the moving window to generate the second error signal $ERROR_2$. The moving window may be used to limit the amount of data history integrated to provide the second error signal $ERROR_2$. The moving window may include a predetermined number of sinusoidal periods of the first error signal $ERROR_1$. The integration may be determined using, for example, equation 1, where t is time and WindowSize is the size of the moving window.

$$ERROR_2 = \int_{t-WindowSize}^{t} |SET - SuperHeat| dt \quad (1)$$

The moving window may have a predetermined size, which may be stored in the memory 220 and accessed by the error module 240. The second error signal $ERROR_2$ may be equal to the amplitude A multiplied by the WindowSize and further multiplied by $2/\pi$. To provide the moving window and perform the integration of the first error signal $ERROR_1$, the error module 240 may include a timer 254 that is incremented to a value equal to the size of the window WindowSize.

The second error signal $ERROR_2$ may be normalized against a baseline. The baseline may include the size of the moving window and a predetermined oscillation amplitude A. The predetermined oscillation amplitude A refers to amplitudes of peak and valleys of a sinusoidal period of a sinusoidal baseline signal. The predetermined oscillation amplitude A is determined to be a maximum amplitude for stable oscillation and system operation. When the first error signal $ERROR_1$ has an amplitude that is greater than the predetermined amplitude A and/or the second error signal $ERROR_2$ is greater than a predetermined threshold, an unstable condition may exist.

The comparison module 242 compares the second error signal $ERROR_2$ to a first predetermined threshold $PredThr_1$ and generates an error comparison signal EC. The error comparison signal EC indicates whether the second error signal $ERROR_2$ is greater than the first predetermined threshold $PredThr_1$.

The zero-crossing counter 244 receives the superheat signal SH and the superheat setpoint signal SET and increments a first count value $Count_1$ when the superheat signal SH is equal to the superheat setpoint signal SET. The zero-crossing module 246 determines whether the first count value $Count_1$ is greater than a second predetermined threshold $PredThr_2$. The zero-crossing module 246 generates a zero-crossing comparison signal ZC to indicate when the first count value $Count_1$ is greater than the second predetermined threshold $PredThr_2$. The second predetermined threshold $PredThr_2$ may be normalized against a second baseline that is determined by the moving window size WindowSize and the oscillation periods. The second predetermined threshold $PredThr_2$ may be set equal to, for example, 1 or a value within a predetermined range of 1.

The boundary hitting counter 248 receives the superheat signal SH and compares the superheat signal SH to a predetermined range limits and/or predetermined value(s) BOUNDARY (referred to hereinafter as boundary value(s) BOUNDARY). The boundary hitting counter 248 increments a second count value $Count_2$ when the superheat signal SH is greater than the predetermined value(s) BOUNDARY. The boundary hitting module 250 compares the second count value $Count_2$ to a third predetermined threshold $PredThr_3$ and generates a boundary comparison signal BC. The boundary hitting module 250 generates the boundary comparison signal BC to indicate when the second count value $Count_2$ is greater than the third predetermined threshold $PredThr_3$. The third predetermined threshold $PredThr_3$ may be normalized against a third baseline that is determined by the moving window size WindowSize and the oscillation periods. The third predetermined threshold $PredThr_3$ may be set equal to 1 or a value within a predetermined range of 1.

The modules 240-252 are used to eliminate false positives and false negatives of whether an unstable superheat condition exists. By normalizing and integrating the error signal, normalizing and determining a number of zero-crossings, and by normalizing and determining a number of times a superheat has exceeded a predetermined boundary, reporting of an unstable condition via the evaluation module 252 is prevented.

The evaluation module 252 generates the instability signal INST based on the comparison signals EC, ZC, BC. The instability signal INST may indicate that an unstable condition exists when, for example, EC and ZC are both TRUE. Indication by the instability signal INST that an unstable condition exists triggers an increase or a decrease in the superheat setpoint signal SET (or superheat setpoint). The change in the superheat setpoint signal SET may be based on the comparison signals EC, ZC, BC. Operation of the superheat setpoint regulation system 200 and the instability module 204 of FIGS. 3 and 4 are further described with respect to the method of FIG. 5.

Figure 5:
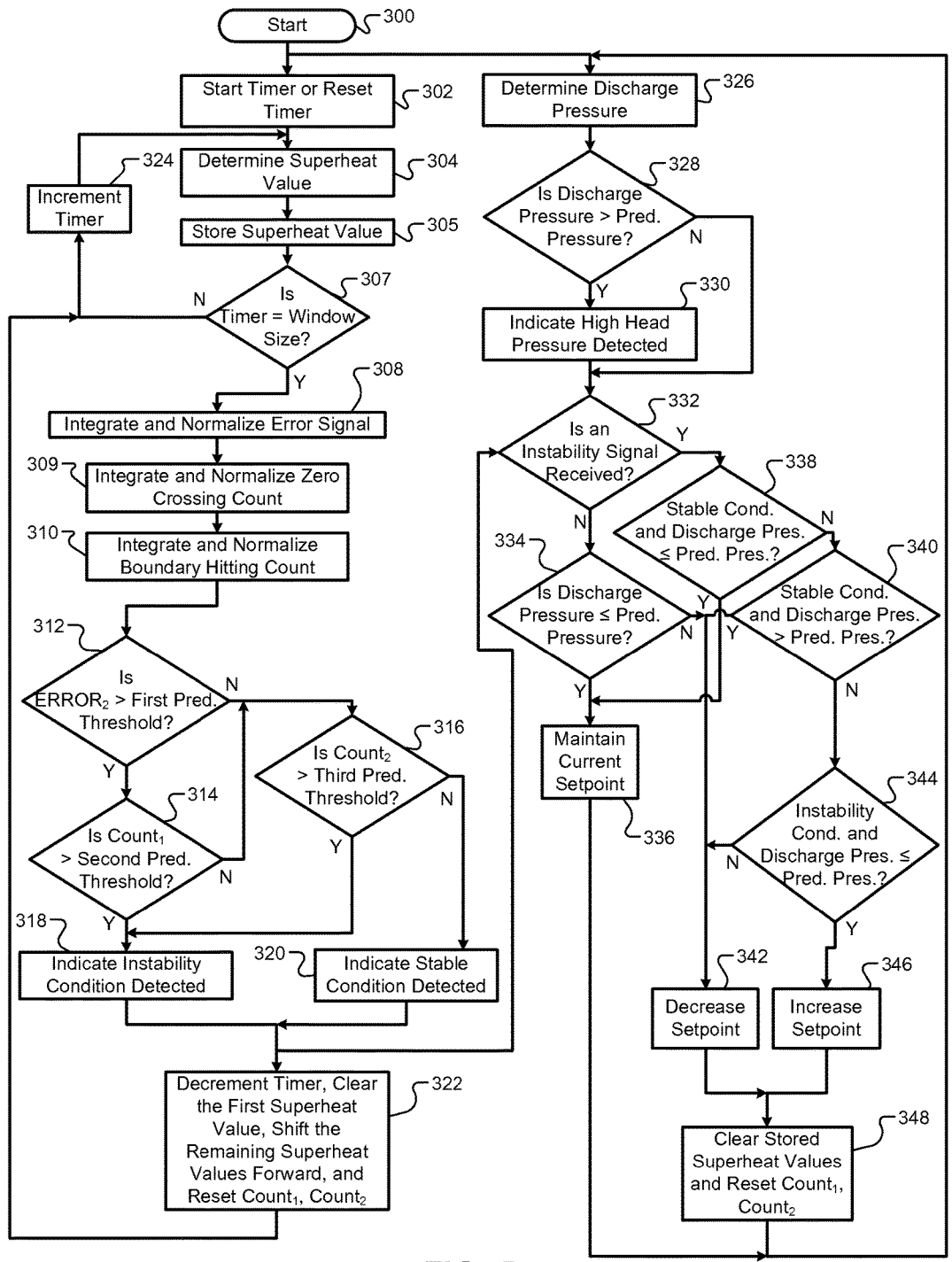
FIG. 5, is a logic flow diagram illustrating a superheat setpoint regulation method in accordance with an aspect of the present disclosure.

The superheat setpoint regulation system 200 may be operated using numerous methods, an example method is provided by the method of FIG. 5. In FIG. 5, a logic flow diagram illustrating a superheat setpoint regulation method is shown. The method may begin at 300. Although the following tasks are primarily described with respect to the implementations of FIGS. 2-4, the tasks may be easily modified to apply to other implementations of the present disclosure. The tasks may be iteratively performed.

At 302, the timer 254 may be started or reset. The timer 254 may be started and/or reset after each time tasks 332-346 are performed.

At 304, the error module 240 determines a superheat value based on the superheat signal SH. At 305, the superheat value for a current timestamp, as indicated by the timer, is stored in the memory 220.

At 307, the instability module 204 determines whether the timer 254 is equal to the WindowSize. Task 308 is performed when the timer 254 is equal to the WindowSize, otherwise task 324 is performed.

At 308, the error module 240 generates an error signal (e.g., the first error signal $ERROR_1$) based on the superheat values stored during tasks 304-307 and a superheat setpoint. Values of the first error signal $ERROR_1$ may be generated by determining differences between each of the superheat values and the superheat setpoint. The error signal is integrated and normalized over the moving window as described above to generate the second error signal $ERROR_2$.

At 309, the zero-crossing (or first) count $Count_1$ is calculated and normalized across the moving window, as described above. At 310, the boundary count (or second) count $Count_2$ is calculated and normalized, as described above.

At 312, the comparison module 242 determines whether the second error signal $ERROR_2$ is greater than the first predetermined threshold $PredThr_1$ and generates the error (or first) comparison signal EC. Task 314 may be performed when the second error signal $ERROR_2$ is greater than the first predetermined threshold $PredThr_1$, otherwise task 316 may be performed.

At 314, the zero-crossing module 246 determines whether the first count $Count_1$ is greater than the second predetermined threshold $PredThr_2$ and generates the zero-crossing (or second) comparison signal ZC. This comparison is performed when at steady state to prevent the integration of the first error signal $ERROR_1$ from "winding up". The zero-crossing counter 246 is used as a second detection criterion to count a number of times the superheat signal SH crosses the superheat setpoint. If the first count $Count_1$ is greater than the second predetermined threshold $PredThr_2$, task 318 is performed, otherwise task 316 is performed.

At 316, the boundary hitting module 250 determines whether the second count $Count_2$ is greater than the third predetermined threshold $PredThr_3$ and generates the boundary comparison signal BC. If the second count $Count_2$ is greater than the third predetermined threshold $PredThr_3$, task 318 is performed, otherwise task 320 is performed.

At 318, the evaluation module 252 may indicate that an unstable superheat condition exists based on the comparison signals EC, ZC, BC. This may be indicated via the instability signal INST. An unstable condition exists when task 314 or task 326 is TRUE. At 320, the evaluation module 252 may indicate that a stable superheat condition exists based on the comparison signals EC, ZC, BC. This may be indicated via the instability signal INST. A stable condition exists when task 316 is FALSE. Tasks 322 and 332 are performed subsequent to tasks 318 and 320.

At 322, the timer is decremented, the first superheat value associated with a first timestamp of the moving window is dropped and/or deleted, the remaining superheat values are shifted forward, and the counts $Count_1$, $Count_2$ are reset. This allows for an updated superheat value to be determined during a subsequent iteration of task 304. During a subsequent iteration of tasks 304-305, the updated superheat value is determined and stored as a last superheat value in the memory 220. The latest stored superheat values are then used when performing a subsequent iteration of task 308. Tasks 304, 305, 307, 322, and 324 provide the moving window, which is used to store the latest predetermined number of superheat values.

As an example, during tasks 304-307 and 324, a predetermined number of superheat values as dictated by the size of the moving window may be stored at addresses of the memory 220 beginning at a first address and ending at a last address. When the remaining superheat values are shifted forward, a first pointer associated with a first time stamp of the moving window may be shifted from the first address (associated with the dropped superheat value) to the second address. A second superheat value was previously stored at the second address. A last pointer associated with the last timestamp of the moving window and previously pointing to the last address (associated with the last previously stored superheat value) may be shifted to an address subsequent to the last address or the first address. This shifts each of the superheat values and allows for the updated superheat value to be stored at the subsequent address or to overwrite the first superheat value at the first address.

Task 324 is performed subsequent to task 322. At 324, the timer is incremented. The timer 254 may be incremented for each iteration of tasks 304-307.

The following tasks 326-330 may be performed in parallel with tasks 302-324. At 326, the boundary hitting counter 248 determines the discharge pressure of a compressor (e.g., one of the compressors, 116, 118, 126, 128). At 328, the boundary hitting counter 248 determines whether the discharge pressure CompDIS is greater than the predetermined pressure $PredPres_2$. Task 330 is performed when the discharge pressure CompDIS is greater than the predetermined pressure $PredPres_2$, otherwise task 332 is performed.

At 330, the boundary hitting counter 248 may indicate that the discharge pressure (or head pressure) is a high-discharge pressure. This may be done by setting, for example, a high discharge flag in the memory 220.

At 332, the setpoint module 208 determines whether the instability signal INST has been generated. Completion of tasks 326-330 may occur prior to completion of tasks 302-324. Task 332 allows the superheat setpoint SET to be adjusted when (i) the discharge pressure CompDIS is not less than or equal to the second predetermined pressure PredPres$_2$, and (ii) tasks 326-330 are completed prior to tasks 302-324. Task 334 is performed when the instability signal INST has not been generated and/or received by the setpoint module 208, otherwise task 338 is performed.

At 334, the setpoint module 208 may determine whether the discharge pressure CompDIS is less than or equal to the second predetermined pressure PredPres$_2$. Task 336 is performed when the discharge pressure CompDIS is less than or equal to the second predetermined pressure PredPres$_2$, otherwise task 342 is performed. At 336, the setpoint module 208 may maintain (or refrain from changing) the superheat setpoint SET.

At 338, the setpoint module 208 determines whether a stable condition exists based on results of tasks 312-316 and whether the discharge pressure CompDIS is less than or equal to the second predetermined pressure PredPres$_2$. If a stable condition exists and the discharge pressure CompDIS is less than or equal to the second predetermined pressure PredPres$_2$, then task 336 is performed, otherwise task 340 is performed.

At 340, the setpoint module 208 determines whether a stable condition exists based on results of tasks 312-316 and whether the discharge pressure CompDIS is greater than the second predetermined pressure PredPres$_2$. If TRUE, task 342 is performed, otherwise task 344 is performed.

At 342, the setpoint module 208 may decrease the superheat setpoint SET. The setpoint module 208 may determine an amount to decrease the superheat setpoint SET. The amount of decrease may be based on the second error signal ERROR$_2$, the discharge pressure CompDIS, the counter values Count$_1$, Count$_2$, results of tasks 312, 314, 316 and/or 318, the instability signal INST, and/or other suitable parameters and/or information. The setpoint module 208 may then decrease the superheat setpoint SET accordingly.

At 344, the setpoint module 208 determines whether an unstable condition exists based on results of tasks 312-316 and whether the discharge pressure CompDIS is less than or equal to the second predetermined pressure PredPres$_2$. If TRUE task 346 is performed, otherwise task 342 is performed.

At 346, the setpoint module 208 may increase the superheat setpoint SET. The setpoint module 208 may determine an amount to increase the superheat setpoint SET. The amount of increase may be based on the second error signal ERROR$_2$, the discharge pressure CompDIS, the counter values Count$_1$, Count$_2$, results of tasks 312, 314, 316 and/or 318, the instability signal INST, and/or other suitable parameters and/or information. The setpoint module 208 may then increase the superheat setpoint SET accordingly.

At 348, the instability module clears the superheat data stored in the memory and resets the count values Count$_1$, Count$_2$. Clearing the superheat data includes deleting the superheat values stored during tasks 304, 305. Task 302 may be performed subsequent to task 348.

Setpoint management provided by the above tasks is used to regulate the superheat setpoint SET such that a superheat condition of a compressor is stabilized for an updated superheat setpoint SET. This improves system operation robustness and reliability.

A cooling system may be operated in a variety of different environments and experience a variety of different operating conditions. For example, portions of a cooling system may experience indoor temperatures of 60° F.-105° F. and other portions of the cooling system may experience outdoor temperatures of −30° F.-105° F. As an example, an evaporator of a cooling system may be located indoors and a condenser of the cooling system may be located outdoors. Traditionally, a superheat value of a compressor was controlled to match a constant superheat setpoint in order to ensure safety of a compressor and improve system efficiency. However, due to the variety of operating conditions, maintenance of a superheat value at a constant superheat setpoint value can lead to poor refrigerant charge management of a compressor and cause unstable system operation.

The below described examples include determining whether to adjust a superheat setpoint to manage a refrigerant charge between an indoor coil (e.g., an evaporator) and an outdoor coil (e.g., a condenser) to obtain stable operation. The superheat setpoint is maintained and/or adjusted based on operating conditions and predetermined and/or initial values. The superheat setpoint is set appropriately for each of the operating conditions to provide a charge balance between the indoor coil and the outdoor coil to stabilize the superheat value and indirectly maintain a predetermined subcooling level.

Figure 6:
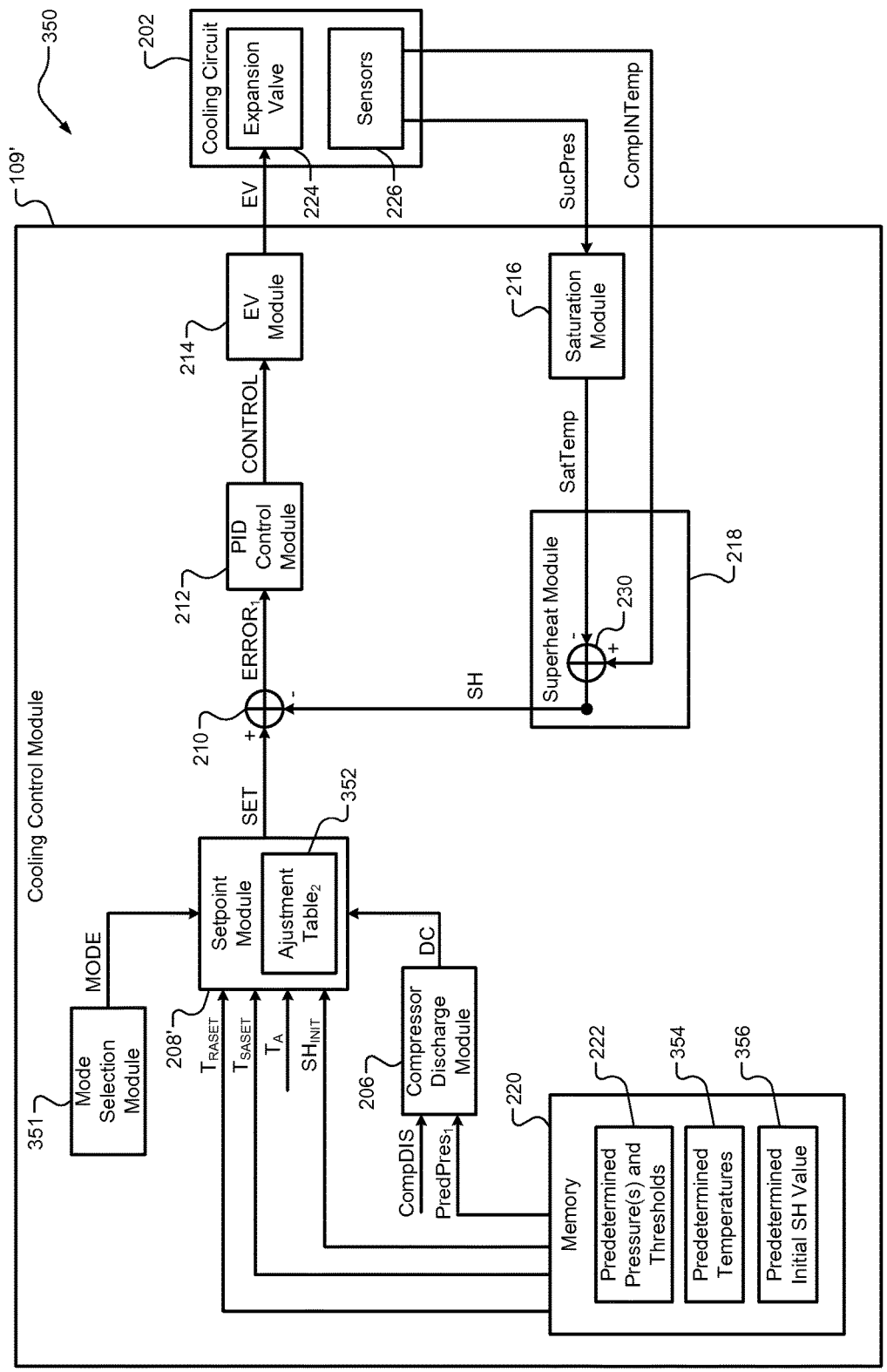
FIG. 6 is a functional block diagram of a superheat setpoint adjustment system in accordance with an aspect of the present disclosure.

FIG. 6 shows a superheat setpoint adjustment system 350 that includes a cooling control module 109' and the cooling circuit 202. The cooling control module 109' may replace the cooling control module 109 of FIG. 2. Although shown as a different module than the cooling control module 109 of FIG. 3, the cooling control module 109' may be the cooling control module 109. In other words, a single cooling control module may provide both the stabilization features of the cooling control module 109 of FIG. 3 and the instability prevention features of the cooling control module 109' of FIG. 6. If an unstable condition exists as determined by, for example, the method of FIG. 5, superheat setpoint control provided by the superheat setpoint adjustment system 350 and the corresponding superheat setpoint adjustment method of FIG. 7 may be overridden. If an unstable condition exists, the superheat setpoint SET may be controlled via the method of FIG. 5 and not based on the method of FIG. 7. If an unstable condition does not exist, the method of FIG. 7 may be performed. Thus, a cooling control module may perform both of the methods of FIGS. 5 and 7 and may override the method of FIG. 7 and adjust a superheat setpoint based on the method of FIG. 5 if an unstable condition is detected.

The cooling control module 109' includes the compressor discharge module 206, a setpoint module 208', the summer 210, the PID control module 212, the expansion valve (EV) module 214, a saturation module 216 a superheat module 218, the memory 220, and a mode selection module 351. The setpoint module 208' includes a second adjustment table 352. The second adjustment table 352 may include the first adjustment table 223 of FIG. 3 and/or may be used to determine the superheat setpoint SET based on inputs provided to the setpoint module 208'. The inputs are shown in FIG. 6 and are described below.

The memory stores the predetermined pressure(s) and thresholds 222, predetermined temperatures 354 and predetermined initial SH setpoint value(s) 356. The predetermined temperatures 354 and the predetermined initial SH setpoint value(s) 356 may be provided by the user interface 329 of FIG. 2 and/or may be predetermined and stored in the memory 220. Different predetermined temperatures and/or predetermined initial SH setpoint values may be stored in the memory 220 for: different types of cooling systems; cooling systems having different types of components (e.g., different types of condensers, evaporators, expansion valves, compressors, etc.); and/or different cooling system configurations.

The mode selection module may select a particular operating mode. These operating modes are described below with respect to the method of FIG. 7. The cooling circuit 202 includes the expansion valve 224 and the sensors 226. The operation of the modules and devices of the cooling control module 109' is further described below with respect to the method of FIG. 7.

Figure 7:
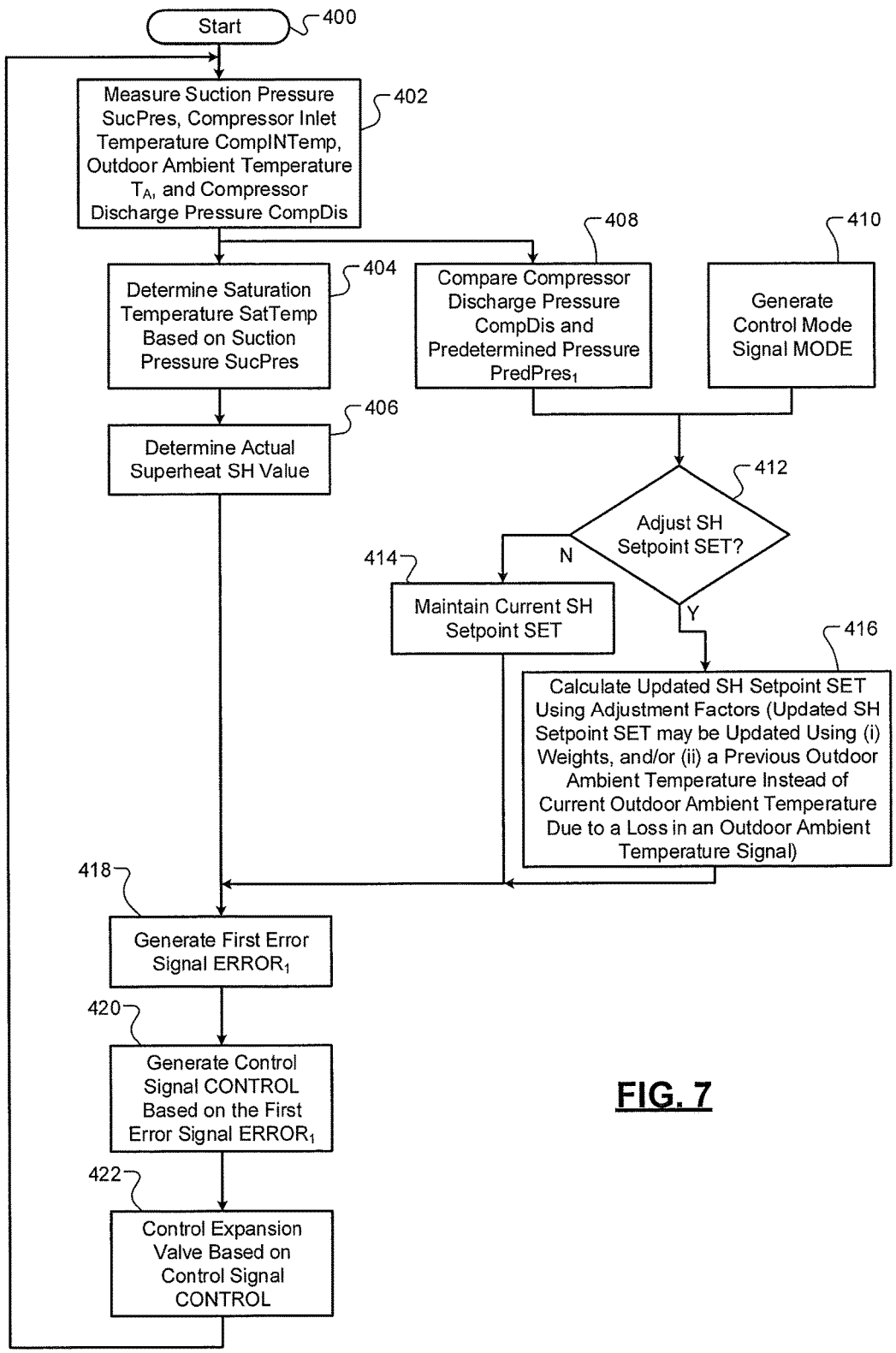
FIG. 7 is a logic flow diagram illustrating a superheat setpoint adjustment method in accordance with an aspect of the present disclosure.

FIG. 7 shows a superheat setpoint adjustment method. Although the following tasks are primarily described with respect to the implementations of FIGS. 6-7, the tasks may be easily modified to apply to other implementations of the present disclosure. The tasks may be iteratively performed. The method may begin at 400. At 402, suction pressure SucPres, compressor inlet temperature CompINTemp, outdoor ambient temperature $T_A$, and compressor discharge pressure CompDis are measured and/or determined. These temperatures and pressures may be detected and/or determined as described above.

At 404, the saturation module 216 determines the saturation temperature SatTemp based on the suction pressure SucPres, as described above. At 406, the superheat module 218 determines the actual superheat value SH is determined based on the saturation temperature SatTemp and the compressor inlet temperature ComINTemp.

The following tasks 408-416 may be performed prior to, during and/or subsequent to tasks 404-406. At 408, the compressor discharge module 206 compares the compressor discharge pressure CompDis to the first predetermined pressure $PredPres_1$ to generate the discharge comparison signal DC, which indicates the difference between the compressor discharge pressure CompDis and the first predetermined pressure $PredPres_1$.

The following task 410 may be performed prior to, during or subsequent to task 408. At 410, the mode selection module 351 may select operation in, for example, a first mode, a second mode, a third mode, or a fourth mode. This selection may be based on a user input from the user interface 329. A user may select operation in the first mode, the second mode, the third mode, or the fourth mode. This selection may be based on whether a return air temperature setpoint $T_{RASET}$ or a supply air temperature setpoint $T_{SASET}$ are provided and stored in the memory 220. The return air temperature setpoint $T_{RASET}$ refers to a predetermined temperature of air returned (or supplied) to an evaporator. The supply air temperature setpoint $T_{SASET}$ refers to a predetermined temperature of air out of the evaporator (and/or a cooling system). These setpoints may be set by the user via the user interface 329 of FIG. 2 or may be predetermined setpoints stored in the memory 220. The predetermined temperatures 354 include these setpoints. The mode selection module 351 generates a mode signal MODE indicating the selected mode.

The first mode may refer to using a first indoor adjustment factor AdSHid1 and an outdoor adjustment factor AdSHod. The second mode may refer to using the outdoor adjustment factor AdSHod and a second indoor adjustment factor AdSHid2. The first mode may not include using the second indoor adjustment factor AdSHid2. The second mode may not include using the first indoor adjustment factor AdSHid1. The third mode may refer to using all of the adjustment factors AdSHid1, AdSHod, AdSHid2. The fourth mode may refer to refraining from adjusting the superheat setpoint SET. Although the fourth mode may be selected, this may be overridden by the method of FIG. 5.

The adjustment factors AdSHid1, AdSHod, AdSHid2 may be predetermined default values used at 416 to adjust the superheat setpoint SET. The adjustment factors AdSHid1, AdSHod, AdSHid2 may be set based on the setup of the cooling system in which the factors are applied and/or the operating conditions in which the cooling system is used. Each different type of cooling system may have different values for the adjustment factors AdSHid1, AdSHod, AdSHid2. In mode 3, the indoor adjustment factors AdSHid1 and AdSHid2 may be weighted to provide a resulting indoor adjustment factor. The weighting of these factors may including multiplying these factors by weights (or values greater than or equal to 0 and less than or equal to 1) and summing the weighted factors to provide the resultant indoor adjustment factor.

At 412, the setpoint module 208' determines whether to adjust the superheat setpoint SET. This determination may be based on, for example, the mode signal MODE, the discharge comparison signal DC, and/or other parameter. As an example, the superheat setpoint SET may be adjusted while operating in one of modes 1-3 and may not be adjusted when operating in mode 4. As another example, if the discharge comparison signal DC is greater than a predetermine value, increasing and/or adjustment of the superheat setpoint SET may be disabled. This causes the superheat setpoint to be decreased and/or maintained at a current superheat setpoint. If the superheat setpoint is not to be adjusted, task 414 may be performed. If the superheat setpoint is to be adjusted, task 416 may be performed. If the superheat setpoint is permitted to decrease and is not permitted to increase, then resultant values, provided by the adjustment of two or more of the factors AdSHid1, AdSHod, AdSHid2 being used for the selected mode, may only be used to adjust the superheat setpoint SET if a sum of the resultant values is negative. The resultant values may be corresponding terms of below provided equations 2-7. As an example, a corresponding term of AdSHid1 may be $ADSHid1*(T_{RASET}-T_1)$. The parameters of the corresponding terms are defined and described below.

At 414, setpoint module 208' maintains the superheat setpoint SET at a current value. At 416, setpoint module 208' adjusts the superheat setpoint SET. The superheat setpoint SET may be adjusted according to any one of equations 2-4. Selection of one of the equations 2-4 may be based on the mode signal MODE, where $SH_{INIT}$ is an initial superheat setpoint. The initial superheat setpoint $SH_{INIT}$ may be the predetermined initial SH value 356 stored in the memory 220. For example, if operating in mode 1, equation 2 may be selected. Equation 3 may be selected if operating in mode 2. Equation 4 may be selected if operating in mode 3.

$$SET=SH_{INIT}+AdSHid1*(T_{RASET}-T_1)+AdSHod*(T_2-T_A) \quad (2)$$

$$SET=SH_{INIT}+AdSHid2*(T_{RASET}-T_3)+AdSHod*(T_2-T_A) \quad (3)$$

$$SET=SH_{INIT}+[W_1*AdSHid1*(T_{RASET}-T_1)]+AdSHod*(T_2-T_A)+[W_2*AdSHid2*(T_{RASET}-T_3)] \quad (4)$$

The indoor adjustment factor AdSHid1 is adjusted based on the return air temperature setpoint $T_{RASET}$ and a first predetermined temperature $T_1$ (e.g., 75° F.). The outdoor adjustment factor AdSHod is adjusted based on the outdoor ambient temperature $T_A$ and a second predetermined temperature $T_2$ (e.g., 95° F.). The indoor adjustment factor AdSHid2 is adjusted based on the supply air temperature setpoint $T_{SASET}$ and a third predetermined temperature $T_3$ (e.g., 55° F.). In equation 4, the indoor adjustment factors AdSHid1, AdSHid2 are adjusted by weights $W_1$, $W_2$.

The adjustment factors AdSHid1, AdSHod, AdSHid2 may be set to predetermined default values and/or may be based on the type and/or setup of the cooling system in which the adjustment factors AdSHid1, AdSHod, AdSHid2 are applied. As an example, default values of the adjustment factors AdSHid1, AdSHod, AdSHid2 may be respectively 0.3, 0.13, 0.3. The default value of the second indoor adjustment factor AdSHid2 may be different than the default value of the first indoor adjustment factor AdSHid1. The predetermined temperatures $T_1$, $T_2$, $T_3$ may be set to predetermined baseline values and/or may be based on the type and/or setup of the cooling system in which the predetermined temperatures $T_1$, $T_2$, $T_3$ are applied. If the temperatures $T_{RASET}$, $T_A$, $T_{SASET}$ are respectively equal to the predetermined temperatures $T_1$, $T_2$, $T_3$, then the superheat setpoint SET is equal to the initial superheat setpoint $SH_{INIT}$.

The outdoor ambient temperature $T_A$ may be averaged over a predetermined period of time (e.g., 5 minutes) to provide an average temperature. The average may be determined by the setpoint module 208' or a temperature module (not shown) within the cooling control module 109'. The average temperature is an average of multiple readings (iterative determinations) of the outdoor ambient temperature $T_A$ over a predetermined period of time. The average temperature may be used instead of the outdoor ambient temperature $T_A$ in equations 2-4 and/or 5-7, which are provided below. This provides system stability by preventing changes in the superheat setpoint SET due to short lasting fluctuations in outdoor ambient temperature. The outdoor ambient temperature can fluctuate due to, for example, wind gusts and/or other outdoor environmental elements. If an average outdoor ambient temperature has not been determined and/or an outdoor ambient temperature has not been determined for the predetermined period of time, for example during startup of the cooling system, then the superheat setpoint SET may be calculated without the $AdSHod*(T_2-T_A)$ term. As a result, one of equations 5-7 may be used instead of respectively one of equations 2-4.

$$SET = SH_{INIT} + AdSHid1*(T_{RASET} - T_1) \quad (5)$$

$$SET = SH_{INIT} + AdSHid2*(T_{RASET} - T_3) \quad (6)$$

$$SET = SH_{INIT} + [W_1*AdSHid1*(T_{RASET} - T_1)] + [W_2*AdSHid2*(T_{RASET} - T_3)] \quad (7)$$

In one embodiment, if the outdoor ambient temperature $T_A$ is less than or equal to a predetermined temperature (e.g., 50° F.), then for purposes of equations 2-4 the outdoor ambient temperature $T_A$ is set at the predetermined temperature (e.g., 50° F.). This is because at temperatures below the predetermined temperature the outdoor ambient temperature 50° F. has minimal or no effect on subcooling. At temperatures below the predetermined temperature, cooling fluid volumes inside a corresponding evaporator and a corresponding condenser may not be changing. For this reason, superheat setpoint SET adjustment may not be performed, as a predetermined amount of subcooling is maintained without adjusting the superheat setpoint SET at these temperatures. At the temperatures below the predetermined temperature, the discharge comparison signal DC may be held at a constant setpoint.

If the outdoor ambient temperature is not provided due to, for example, the outdoor ambient temperature sensor 150 being disconnected or loss in a signal from the outdoor ambient temperature sensor 150, then a previous outdoor ambient temperature (previously determined $T_A$) may be used as a current outdoor ambient temperature. The previous outdoor ambient temperature may be used if the outdoor ambient temperature or corresponding sensor signal from the outdoor ambient temperature sensor 150 is not provided for less than a predetermined period of time (e.g., 1-2 seconds). The cooling control module 109' may detect loss in the outdoor ambient temperature signal when a voltage of the outdoor ambient temperature signal drops more than a predetermined amount and/or is negative. This prevents improperly adjusting the superheat setpoint SET due to loss in the outdoor ambient temperature signal.

Subsequent to tasks 406, 414, and/or 416, task 418 is performed. At 418, the summer 210 generates the first error signal $ERROR_1$ based on the superheat setpoint SET provided by the setpoint module 208' and the superheat level SH provided by the superheat module 218. The superheat setpoint SET may be the current superheat setpoint provided at 414 or the updated superheat setpoint provided at 416. Subsequent to performing task 416, the updated superheat setpoint becomes the current superheat setpoint.

At 420, the PID control module 212 generates the control signal CONTROL based on the first error signal $ERROR_1$. At 422, the EV module 214 generates the EV signal based on the control signal CONTROL to adjust a state of the expansion valve 224.

The above-described method of FIG. 7 provides robust superheat detection and auto-scheduling maintenance and/or adjustment of a superheat setpoint. By adjusting the superheat setpoint SET and controlling the state of the expansion valve 224 based on the adjusted superheat setpoint SET, the expansion valve 224 reacts to manage refrigerant (or cooling fluid) flow between an evaporator (e.g., one of the evaporators 110, 120 of FIG. 2) and a condenser (e.g., one of the condensers 114, 124 of FIG. 2) for system charge balancing. This allows for subcooling to be maintained and/or a predetermined level of subcooling to be maintained at an inlet of the expansion valve 224.

The method maintains a subcooling level without use of a pressure sensor and/or a temperature sensor to measure pressure out of a condenser and/or a temperature out of a refrigerant (or fluid) out of a condenser.

The above-described tasks of FIGS. 5 and 7 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a setpoint module configured to indirectly control subcooling of a condenser by adjusting a superheat setpoint based on (i) a return air temperature setpoint or a supply air temperature setpoint, and (ii) an outdoor ambient temperature, wherein the setpoint module is configured to set the superheat setpoint by calculating the superheat setpoint based on values of (i) the return air temperature setpoint or the supply air temperature setpoint, and (ii) the outdoor ambient temperature;
a summer configured to determine an error between the superheat setpoint and a superheat level of a compressor;
a control module configured to generate a control signal based on the error; and
an expansion valve module configured to electronically control a state of an expansion valve based on the control signal,
wherein the setpoint module is configured to
obtain a plurality of adjustment factors for adjusting the superheat setpoint, wherein the plurality of adjustment factors are predetermined values selected based on one of a plurality of setups and one of a plurality of types of the system,
select an operating mode from a plurality of operating modes, wherein the setpoint module, while operating in each of the plurality of operating modes, calculates the superheat setpoint differently than while operating in the other ones of the plurality of operating modes, and wherein each of the plurality of operating modes uses a corresponding two or more of the plurality of adjustment factors, and
adjust the superheat setpoint based the selected operating mode.

2. The system of claim 1, wherein the setpoint module is configured to adjust the superheat setpoint based on an initial predetermined superheat level of the compressor.

3. The system of claim 1, wherein the setpoint module is configured to adjust the superheat setpoint based on (i) the return air temperature setpoint, (ii) the outdoor ambient temperature, and (iii) an initial predetermined superheat level of the compressor.

4. The system of claim 1, wherein the setpoint module is configured to adjust the superheat setpoint based on (i) the supply air temperature setpoint, (ii) the outdoor ambient temperature, and (iii) an initial predetermined superheat level of the compressor.

5. The system of claim 1, further comprising a mode selection module configured to select an operating mode, wherein the setpoint module is configured to, based on the selected operating mode, adjust the superheat setpoint based on (i) the return air temperature setpoint, or (ii) the supply air temperature setpoint.

6. The system of claim 1, wherein the setpoint module is configured to adjust the superheat setpoint based on an average of iterative determinations of the outdoor ambient temperature over a predetermined period of time.

7. The system of claim 1, wherein setpoint module is configured to (i) detect a loss in an outdoor ambient temperature signal, and (ii) use a previous outdoor ambient temperature as a current outdoor ambient temperature to prevent changing the superheat setpoint due to the loss in the outdoor ambient temperature signal.

8. The system of claim 1, wherein:
setpoint module is configured to determine, based on a discharge comparison signal, whether to refrain from changing the superheat setpoint;
the discharge comparison signal indicates a difference between a discharge pressure of the compressor and a predetermined pressure; and
the setpoint module is configured to refrain from changing the superheat setpoint based on a result of the determining whether to refrain from changing the superheat setpoint.

9. The system of claim 1, wherein:
the summer is configured to determine an error between the adjusted superheat setpoint and the superheat level of the compressor; and
the control module is configured to generate the control signal based on the error between the adjusted superheat setpoint and the superheat level.

10. The system of claim 1, wherein the setpoint module is configured to:
operate in an additional operating mode not included in the plurality of operating modes; and
refrain from adjusting the superheat setpoint while operating in the additional operating mode.

11. The system of claim 1, wherein:
the plurality of operating modes include a first operating mode, a second operating mode, and a third operating mode;
the plurality of adjustment factors include a first adjustment factor, a second adjustment factor and a third adjustment factor; and
the setpoint module is configured to:
during the first operating mode, use the first adjustment factor and the second adjustment factor to adjust the superheat setpoint,
during the second operating mode, use the third adjustment factor and the second adjustment factor to adjust the superheat setpoint, and
during the third operating mode, use the first adjustment factor, the second adjustment factor and the third adjustment factor.

12. The system of claim 1, wherein:
the plurality of operating modes include a first operating mode, a second operating mode and a third operating mode;
the plurality of adjustment factors include a first adjustment factor and a second adjustment factor; and
the setpoint module is configured to:
during the first operating mode, adjust the superheat setpoint based on the first adjustment factor and a first predetermined temperature,
during the second operating mode, adjust the superheat setpoint based on the second adjustment factor and a second predetermined temperature, and
during the third operating mode, adjust the superheat setpoint based on the first adjustment factor, the second adjustment factor, the first predetermined temperature and the second predetermined temperature.

13. The system of claim 12, wherein:
the plurality of adjustment factors comprise a third adjustment factor; and
during the third operating mode, the setpoint module is configured to adjust the superheat setpoint based on (i) a weighting of a difference between the return air temperature setpoint and the first predetermined temperature, and (ii) a weighting of a difference between the return air temperature setpoint and the second predetermined temperature.

14. The system of claim 1, wherein the setpoint module is configured to:
during a first operating mode, adjust the superheat setpoint based on the return air temperature setpoint, one of the plurality of adjustment factors and a predetermined temperature, and
during a second operating mode, adjust the superheat setpoint based on a weighting of the one of the plurality of adjustment factors and a difference between the return air temperature setpoint and the predetermined temperature.

15. The system of claim 8, wherein the setpoint module is configured to:
if the discharge comparison signal is greater than a predetermined value, disable adjusting the superheat setpoint; and
if the discharge comparison signal is less than or equal to the predetermined value, enable adjusting the superheat setpoint.

16. The system of claim 1, wherein the plurality of adjustment factors include one or more indoor adjustment factors and one or more outdoor adjustment factors.

17. The system of claim 14, wherein the one of the plurality of adjustment factors is an indoor adjustment factor.

18. A system comprising:
a setpoint module configured to indirectly control subcooling of a condenser by adjusting a superheat setpoint based on (i) a return air temperature setpoint or a supply air temperature setpoint, and (ii) an outdoor ambient temperature, wherein the setpoint module is configured to set the superheat setpoint by calculating the superheat setpoint based on values of (i) the return air temperature setpoint or the supply air temperature setpoint, and (ii) the outdoor ambient temperature;
a summer configured to determine an error between the superheat setpoint and a superheat level of a compressor;
a control module configured to generate a control signal based on the error; and
an expansion valve module configured to electronically control a state of an expansion valve based on the control signal, wherein the setpoint module is configured to
- obtain a plurality of adjustment factors for adjusting the superheat setpoint,
- adjust the plurality of adjustment factors based on the return air temperature setpoint and a plurality of predetermined temperatures,
- determine resultant values based on adjustments to the plurality of adjustment factors,
- determine a sum of the resultant values, and
- if the superheat setpoint is permitted to decrease and is not permitted to increase and the sum is negative, use the resultant values to adjust the superheat setpoint.

19. The system of claim 18, wherein the plurality of adjustment factors include one or more indoor adjustment factors and one or more outdoor adjustment factors.

* * * * *